United States Patent [19]

Schiel

[11] Patent Number: 5,925,219

[45] Date of Patent: Jul. 20, 1999

[54] SHOE PRESS WITH STOP

[75] Inventor: Christian Schiel, Heidenheim, Germany

[73] Assignee: Voith Sulzer Papiermaschinen GmbH, Heidenheim, Germany

[21] Appl. No.: 08/866,413

[22] Filed: May 30, 1997

[30] Foreign Application Priority Data

May 31, 1996 [DE] Germany .......................... 196 22 018

[51] Int. Cl.⁶ .................................................... D21F 3/02
[52] U.S. Cl. ...................... 162/205; 162/358.3; 162/361
[58] Field of Search ............................... 162/358.3, 361, 162/358.4, 358.5; 100/153

[56] References Cited

U.S. PATENT DOCUMENTS

| | | | |
|---|---|---|---|
| 4,530,227 | 7/1985 | Schlatter et al. | 72/241 |
| 4,643,802 | 2/1987 | Schiel | 162/358.3 |
| 4,917,768 | 4/1990 | Ilmarinen | 162/358.3 |
| 5,262,011 | 11/1993 | Ilmarinen | 162/358.3 |
| 5,650,047 | 7/1997 | Meschenmoser | 162/358.3 |
| 5,676,799 | 10/1997 | Meschenmoser et al. | 162/358.3 |

FOREIGN PATENT DOCUMENTS

| | | |
|---|---|---|
| 0066528 | 12/1982 | European Pat. Off. . |
| 254819 | 2/1988 | European Pat. Off. . |
| 0345501 | 12/1989 | European Pat. Off. . |
| 345501 | 12/1989 | European Pat. Off. . |
| 3317974 | 11/1988 | Germany . |
| 4409316 | 6/1995 | Germany . |
| 4402595 | 1/1996 | Germany . |
| 4435845 | 1/1996 | Germany . |

OTHER PUBLICATIONS

European Search Report and Annex dated Oct. 30, 1997.

*Primary Examiner*—Karen M. Hastings
*Attorney, Agent, or Firm*—Greenblum & Bernstein P.L.C.

[57] ABSTRACT

Shoe press for treating a material web that may include a press shoe to be pressed against an opposing element, e.g., a counter roll, with a fluid permeable press jacket and a felt belt being positionable between the press shoe and the opposing element, and a plurality of support elements including cylinder devices and pistons supported on a carrier. The press shoe may have a concave-shaped press face forming a nip with the opposing element such that the nip has a predetermined longitudinal span. The press shoe may be movable on the plurality of support elements, and the pistons of the plurality of support elements may carry the press shoe to permit a tilting movement of the press shoe both in a web travel direction and lateral to the web travel direction. A stop may support the press shoe in the web travel direction and may absorb horizontal forces acting on the press shoe. A tilt axis of the press shoe and a stop face of the stop may be substantially positioned in one of a common plane and an imaginary cylinder face having a radius greater than 250 m, and a press plane may be disposed substantially perpendicular to one of the common plane and the imaginary cylinder face.

39 Claims, 3 Drawing Sheets

SHOE PRESS WITH STOP

CROSS-REFERENCE TO RELATED APPLICATIONS

The present invention claims priority under 35 U.S.C. § 119 of German Patent Application No. 196 22 018.1 filed on May 31, 1996, the disclosure of which is expressly incorporated by reference herein in its entirety.

BACKGROUND OF THE INVENTION

1. Field of the Invention

The present invention relates to a shoe press for treating of a material web. The shoe press may include a press shoe, having a concave-shaped face, to be pressed against an opposing element, e.g., a counter roll, to form a nip of a predetermined longitudinal span. A fluid impermeable press jacket and a felt belt may be interposed between the press shoe and the opposing element. A plurality of support elements may include cylinder/piston devices supported on a carrier. The press shoe may move on the pistons of the support elements and may be carried to permit a tilting movement both in the web travel direction and lateral to the web travel direction, and may be supported in a web travel direction on a stop for absorbing horizontal forces acting on the press shoe.

2. Description of Background Information

A shoe press of the type similar in general to the above-described shoe press is disclosed in EP 0 345 501. According to EP 0 345 501, the press shoe rests so that it can move freely on the pistons of a number of cylinder/piston devices. A stop is provided behind the press shoe, i.e., with respect to a web travel direction, and the press shoe is pressed against the stop by frictional forces acting between the material web and the press jacket during operation. The invention of EP 0 345 501 strives to position the press shoe parallel to the axis of the counter roll.

However, in the shoe press of the prior art, the desired parallel arrangement is only achieved if a resultant pressure centrally engages the press shoe. In a normally selected pressure progression curve in the nip, pressure increases in the web travel direction, and the resultant pressure acts on the press shoe in an eccentric manner. This leads to a tilting motion, and a tilting of the press shoe with respect to the axis of the counter roll, as a result of a more intense compression of the felt and material web on an outlet end of the press shoe than on an inlet end of the shoe press.

As a result of the tilting motion, a distance between the press-shoe and the stop changes. If, e.g., the pressure is increased, the press shoe tilts such that the press shoe is lifted up from the stop on its outlet or nip outlet end. However, if the press shoe is resting against the stop, and the resultant pressure acting on the press shoe is tilted in an opposite direction in accordance with a decreasing eccentricity, which can occur, e.g., due to a reduction of the linear force or at a constant linear force with a reduction of the compressibility of a newly inserted felt, e.g., when being broken in during the first hours of operation, then jams and a high degree of sticking occur between the stop and the press shoe, between the press shoe and the pistons, and between the pistons and the piston guides.

The clamping forces can become so high that considerable wear must be contended with and the attendant friction forces can undesirably change the pressure distribution in the web travel direction acting in the nip. In particular, if the clamping does not occur over an entire width of the machine, varying pressure distribution curves may result over the width of the machine. This may, in turn, have undesirable consequences on the uniformity of the paper quality.

In the shoe press of the prior art, it is considered disadvantageous that the initial position of the press shoe can be crooked or bowed before the start of loading and then remain that way when loaded because the disadvantages mentioned with regard to paper quality result.

SUMMARY OF THE INVENTION

Therefore, it is an object of the present invention to produce a shoe press of the type described above, in which a pressure distribution in the nip, both in a web travel direction and lateral to the web travel direction, may be precisely adjusted to achieve uniform paper quality and in which wear occurring on pistons, a press shoe, and a stop may be minimized.

In particular, when the press shoe is tilted, no spacing change of any consequence should be produced between the press shoe and the stop, and the friction forces arising during operation should be minimized. Further, thermal warping of the press shoe, e.g., when a temporary interruption in operation occurs, should be, to a large extent, compensated for in order to achieve the goal of uniform pressure distribution over the width, and, at the same time, to minimize wear and tear.

This object may be achieved substantially by arranging a tilt axis of the press shoe and a stop face of a stop substantially perpendicular to a press plane (located) in one of a common plane or in a cylinder face having a radius greater than 250 m.

This embodiment achieves the object of the present invention during operation, when a tilting motion acts on the press shoe and no spacing change occurs between the press shoe and the stop. As a result of the present invention, contact conditions of the press shoe against the stop and friction and clamping forces acting between the stop, press shoe, and pistons may be kept low. Therefore, the influence of the tilting motion of the press shoe on a pressure distribution in the nip may be minimized. Thus, a uniform paper quality may be attained over an entire width of the machine.

Only in rare instances may the tilt axis and, consequently, the stops be located in a single plane, even if they have been located without load. This is because the carrier and/or the counter roll may be deflected when loaded. Accordingly, location of the tilt axis and stops may be more or less intensely deflected.

According to a preferred embodiment of the present invention, a center of the stop face may be offset in a direction of the opposing element relative along the cylinder face passing through the tilt axis of the press shoe. The offset may be less than or equal to approximately one third a maximal structural stroke of the press shoe, e.g., a maximum of approximately 15 mm. Thus, the press shoe may tilt toward a front or the upstream side with increasing load, i.e. the inlet end may approach the counter roll less than the outlet end may approach the counter roll, because the arrangement produces a lift of less than 0.1 mm between the press shoe and the stop. As a result, sliding movements, e.g., under high jamming force, may be prevented and wear and tear may be minimized. Alternatively, such small potential deviations from-the straightness of the press shoe may be inconsequential in relation to the uniform shape of the pressure distribution curve lateral to the shoe press.

In a suitable manner, devices may be provided on the press shoe and/or the piston for reducing the friction occurring between the press shoe and the piston so as to further minimize wear generating jams. Thus, the pistons or the press shoe can be provided on their faces oriented toward one another with a slip coating. The corresponding opposing faces may be formed as smooth and metallic. Because coating materials with particularly low coefficients of friction are mostly too soft, they may be deposited in combination with additional support materials. Accordingly, slip material and support material may be regularly or randomly interspersed with each other. Bodies or fibers may be imbedded, e.g., in a stable matrix to form the slip material or, alternatively, fibers, felt, or cloth may reinforce a slip material matrix.

Alternatively, or additionally, hydraulic pressure pockets may be provided in end faces of the pistons carrying the press shoe. The pockets may be utilized to reduce the normal force to be mechanically transmitted and the friction force. These hydraulic pockets can be formed arbitrarily, e.g., as circular, oblong, or angular, in the end face of the piston. The pressure in the hydraulic pockets may be arbitrarily adjusted or may be brought into line with the piston pressure via communication with the pressure chamber of the support elements.

In an advantageous manner, thermal warping of the press shoe may also be prevented. For example, the press shoe may include a lower shoe part resting on the support elements and an upper shoe part having a press face, such that, between the lower shoe part and the upper shoe part, a heat insulating element may be provided that counteracts a heat transfer from the upper shoe part to the lower shoe part.

Alternatively, or additionally, coolant conduits may also be provided in the press shoe to enable coolant flow for cooling the press shoe during operation. Advantageously, the coolant conduits may extend in the web travel direction from the region of the nip inlet into, or just ahead of, the region of the press plane, and feed with flaring outlet bores into the slip face of the press shoe. With this arrangement, the press shoe may be cooled in a region of the nip inlet by heat transfer from the coolant conduits and in a region of the nip outlet by a lubricant film, into which the coolant has been pressed. Because the outlet bores have a flared portion, e.g., like trumpets, having an outlet area in a region of the slip face of, e.g., approximately 1 to 3 cm$^2$, cooling oil may be distributed over as wide an area as possible in the lubricant film.

Another useful feature of the present invention may include that the lifted press shoe may be acted upon so that it rests completely, or almost completely, against the outlet end stops. This may occur, e.g., due to spring pressure. However, because the spring pressure may increase friction forces and wear, a wedge device may be selected, close to a stroke end of the press shoe.

The present invention may be directed to a shoe press for treating a material web. The shoe press may include a press shoe to be pressed against an opposing element with a fluid impermeable press jacket and a felt belt being positionable between the press shoe and the opposing element, and a plurality of support elements including cylinder devices and pistons supported on a carrier. The press shoe may have a concave-shaped press face forming a nip with the opposing element having a predetermined longitudinal span. The press shoe may be movable on the support elements, and the pistons of the plurality of support elements may carry the press shoe to permit a tilting movement of the press shoe both in a web travel direction and lateral to the web travel direction. A stop may support the press shoe in the web travel direction and may absorb horizontal forces acting on the press shoe. A tilt axis of the press shoe and a stop face of the stop may be substantially positioned in one of a common plane and an imaginary cylinder face having a radius greater than 250 m, and a press plane may be disposed substantially perpendicular to one of the common plane and the imaginary cylinder face.

According to another feature of the present invention, a center of the stop face may be offset in a direction of the opposing element relative to the one of the common plane and the imaginary cylinder face passing through the tilt axis of the press shoe. The offset may be less than or equal to one third a maximal structural stroke of the press shoe.

According to another feature of the present invention, a center of the stop face may be offset in a direction of the opposing element relative to the imaginary cylinder face passing through the tilt axis of the press shoe. The offset may be maximally approximately 15 mm.

According to still another feature of the present invention, at least one of the press shoe and the pistons may include a portion for reducing friction occurring between the press shoe and the pistons. Further, the pistons may include end faces, carrying the press shoe, having a slip coating. The slip coating may include a stable, pressure absorbing matrix with an imbedded slip material to reduce sliding friction. Alternatively, the slip coating may include a matrix having a slip material reinforced by one of fibers, felt, and cloth. Still further, the slip coating may include a slip material including one of polytetrafluoroethylene, molybdenum sulfite, and polyethylene.

According to a further feature of the present invention, the shoe press may also include hydraulic pressure pockets formed in the end faces of the pistons. Further, fluid pressure in the hydraulic pressure pockets may be adjustable to a higher value than pressure in a cylinder chamber associated with the pistons. Alternatively, the hydraulic pressure pockets may communicate with pressure chambers formed in the support elements through bores in the pistons. The end faces of the pistons may also include pressureless pockets such that the pressure pockets may be formed as annular and the pressureless pockets may be formed inside the pressure pockets.

According to another feature of the present invention, the press shoe may include a lower shoe part resting freely on the support elements, an upper shoe part having a press face, and a heat insulating element provided between the lower shoe part and the upper shoe part to counteract a heat transfer from the upper shoe part to the lower shoe part.

According to a still further feature of the present invention, the shoe press may include coolant conduits provided in the press shoe to enable coolant to flow to cool the press shoe during operation. Further, the coolant conduits may extend in the web travel direction from a region of a nip inlet into one of a region of and just ahead of a region of the press plane. The coolant conduits may include flaring outlet bores coupled to a press face of the press shoe. The coolant conduits may communicating on an inlet end with a common supply line extending, in the region of the nip inlet, lateral to the web travel direction. The coolant conduits may be formed as throttle bores and the flaring outlet bores may include, in an exit region on the press face, a cross sectional area of between approximately 1 cm$^2$ to 3 cm$^2$. Further, axes of the outlet bores may be formed to be inclined approximately 1° to 3° in the web travel direction relative to the press plane. Still further, the coolant conduits may be positioned parallel to one another and may be spaced apart lateral to the web travel direction by approximately 15 to 50 mm.

According to another feature of the present invention, the press shoe may include a material having a low coefficient of thermal expansion.

According to yet another feature of the present invention, the opposing element may include a counter roll.

The present invention may be directed to a shoe press for forming an extended nip with an opposing element to treat a material web guided through the extended nip in a web travel direction. The shoe press may include a press shoe, a support element having a first portion for supporting the press shoe and enabling tilting movement around a tilt axis of the press shoe in at least one of in and lateral to the web travel direction, a stop, having a stop face, for supporting the press shoe and for restraining movement of the press shoe in the web travel direction, a press plane disposed through the extended nip and including the tilt axis of the press shoe and a substantially planar arrangement of the tilt axis and the stop face.

According to another feature of the present invention, the substantially planar arrangement may include a plane. Alternatively, the substantially planar arrangement may include an imaginary cylinder face having a radius greater than 250 m.

According to another feature of the present invention, the support element may include a guiding and sealing region for guiding movement of the first portion substantially parallel to the press plane, and the substantially planar arrangement may also include the guiding and sealing region. Further, the first portion may include an end face supporting an underside of the press shoe and at least one of the underside of the press shoe and the end face may include a surface that reduces friction between the underside of the press shoe and the end face. The end face may include a pressure pocket for carrying the press shoe. Still further, the support element may include second portion that moves relative to the first portion and the press pocket may communicate with the second portion through a bore formed in the first portion. The end face may also include a pressureless pocket formed within the pressure pocket and the pressureless pocket may communicate with an exterior of the support device through an additional bore formed in the first portion. The pressure pocket may include an annular shape. Alternatively, the pressure pocket may be formed by an annular, elastically supported seal.

According to still another feature of the present invention, the press shoe may include an inlet side and an outlet side formed on opposite sides of the press plane. The inlet side may include a coolant supply line extending through the inlet side and lateral to the web travel direction. The inlet side may also include coolant conduits for transporting coolant from the coolant supply line through the inlet side in a web travel direction and an outlet bore for transporting coolant from the coolant conduits to a surface of the press shoe forming the extended nip.

According to a still further feature of the present invention, the support element may also include a second portion, such that the first portion may include at least one piston and the second portion may include a cylinder.

According to yet another feature of the present invention, the shoe press may also include a rib coupled to an underside of the press shoe and located between adjacent support elements. Further, the rib may have a flared end to contact the stop face.

The present invention may be directed to a method for treating a material web that may include movably supporting a press shoe on a support element that may include at least a cylinder and piston, aligning a stop face of a stop device and a tilt axis of the press shoe in a substantially planar arrangement, positioning a press plane to include the tilt axis, forming an extended nip between a press shoe and an opposing element, guiding the material web through the extended nip through extended nip in a web travel direction, supporting a tilting of the press shoe about the tilt axis in at least one of in and lateral to the web travel direction, and absorbing horizontal forces acting on the press shoe in the web travel direction with the stop device.

According to another feature of the present invention, the substantially planar arrangement may include locating the tilt axis and the stop faces in a common plane. Alternatively, the substantially planar arrangement may include locating the tilt axis and the stop faces in an imaginary cylinder face having a radius greater than 250 m.

According to another feature of the present invention, the method may also include providing a sliding surface on at least one of the piston and the press shoe to reduce friction forces between the piston and the press shoe.

According to still another feature of the present invention, the movably supporting of the press shoe may include forming a pressure pocket in a face of the support element contacting the press shoe and providing a pressure fluid to the pressure pocket, the pressure fluid supporting the press shoe.

According to yet another feature of the present invention, the method may further include conducting a coolant through the press shoe from within the press shoe to an outer surface of the press shoe forming the extended nip. The conducting of the coolant may include forming a coolant supply line within an inlet portion of the press shoe and forming a plurality of substantially parallel coolant conduits extending from the coolant supply to fluid outlets. The fluid outlets may be located at a position less than a mid-point of the press shoe, in the web travel direction, and the fluid outlets may include flared conduit portions.

Other exemplary embodiments and advantages of the present invention may be ascertained by reviewing the present disclosure and the accompanying drawing figures.

BRIEF DESCRIPTION OF THE DRAWINGS

The present invention may be further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

Figure 1:
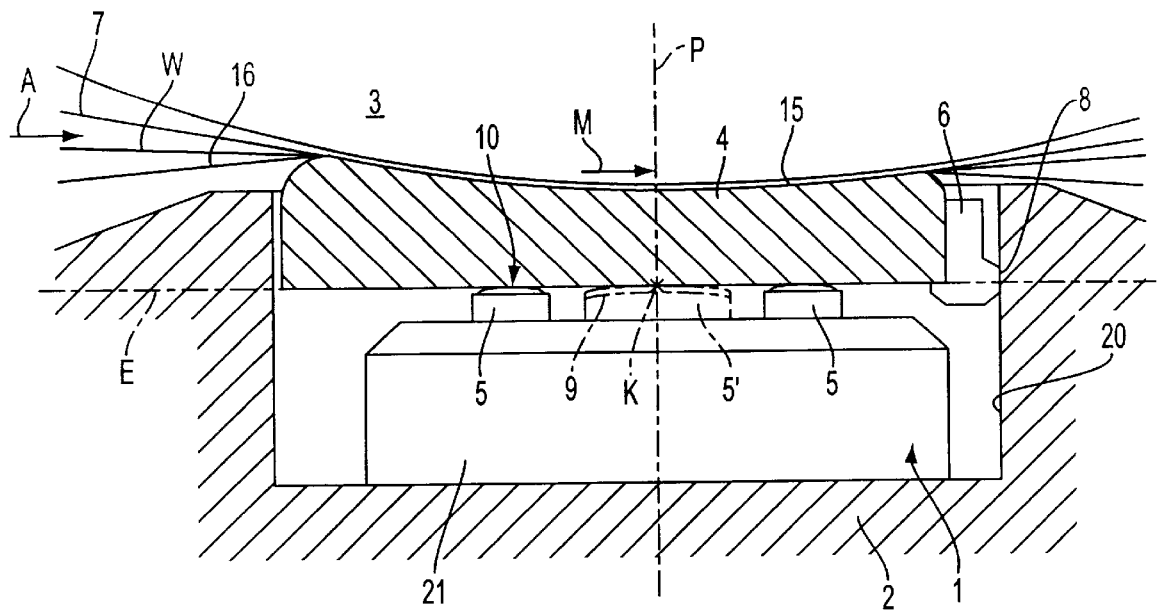
FIG. 1 illustrates a cross section of a first embodiment of a shoe press in accordance with the present invention.

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawing figures making apparent to those skilled in the art how the invention may be embodied in practice.

FIG. 1 illustrates a first embodiment of a shoe press, and a manner in which it may be used, e.g., for de-watering a material web W. The shoe press may be comprised of a rotating, driven roll 3 and a press shoe 4. Press shoe 4 may be located on a stationary carrier 2 and may be radially pressed from the outside against roll 3.

Press shoe 4 may include a concave-shaped press face 15 complements the circumferential face of roll 3. Thus, press face 15 of press shoe 4 may be pressed against the circumferential face of roll 3 to form an extended nip with a predetermined longitudinal span. Material web W, which is to be treated, may be guided through the extended nip in a web travel direction A, between a felt belt 7 and a press jacket 16 that may be wound around press shoe 4. Alternatively, Material web W may be positioned between roll 3 and felt belt 7.

Press shoe 4 may be supported on an underside by at least two rows of support elements 1 that laterally extend in web travel direction A. Support elements 1 may comprise cylinder/piston devices and may have pistons 5 located and guided in a cylinder block 21. Press shoe 4 may be supported by pistons 5 to freely enable movement and tilt both in the web travel direction A and lateral to the web travel direction A. A tilt axis K may be located on the underside of press shoe 4 between the upper ends of pistons 5.

Alternatively, the present invention may utilize a single row of pistons 5' (shown in dot-dash lines) in lieu of the two parallel rows of pistons 5. In this embodiment, the tilt axis may be located on the underside of press shoe 4 and on the upper end of the pistons 5'.

After press shoe 4, i.e., when viewed in relation to the web travel direction A, a stop 6 may be positioned to absorb horizontal forces acting on press shoe 4. Stop 6 may be screwed or otherwise coupled to press shoe 4 and may rest with a stop face 8 positioned against a vertical guide face 20 of carrier 2. A center of stop face 8 may be substantially positioned at a same level as the upper ends of pistons 5 (or pistons 5') and, accordingly, at a same level as tilt axis K. This same level may be represented as a plane E.

However, in practice, tilt axis K and the center of the stop face may only rarely be positioned within plane E, as shown in FIG. 1. This is because carrier 2 and/or roll 3 may be deflected when loaded. Thus, given the practical considerations, a more or less intensely deflected positioning of tilt axis K and stop 6 may occur such that tilt axis K and the center of stop face 8 may be positioned on an imaginary cylinder face whose curvature radius is greater than 250 m.

During operation, the roll 3 may rotate around its axis in a direction of arrow M. Further, the rotational axis of roll 3 may lie within a press plane P that comprises the resulting pressures that are exerted normal to the nip by a respectively even pressure by the two parallel rows of pistons 5.

When pressure is exerted, felt belt 7 and material web W may be unevenly compressed over a length of a press zone in a region of concave press face 15. Thus, press shoe 4 may not only be moved parallel and toward the roll 1, but may also be tilted because a distance between press shoe 4 and roll 3 at a nip inlet may change by a different amount than a distance between press shoe 4 and roll 3 at an nip outlet.

Further, the tilting motion of press shoe 4 may cause undesired consequences for the shoe press. For example, when press shoe 4 is tilted such that the inlet nip distance is greater than the outlet nip distance, stop face 8 of stop 6 may be urged to lift up from vertical guide face 20. An alternative example would be when press shoe 4 is tilted such that the inlet nip distance is less than the outlet nip distance, high jamming forces may occur between stop face 8 of stop 6 and vertical guide face 20, between pistons 5 (or pistons 5') and the corresponding piston guides in cylinder block 21, and between pistons 5 (or pistons 5') and press shoe 4. To prevent these undesired consequences, the present invention may position stop face 8 of stop 6 and tilt axis K at a same level, i.e. within a common plane E or along an imaginary cylinder face substantially perpendicular to press plane P.

Pistons 5 (or pistons 5') may include end faces 10 that support the underside of press shoe 4. The end faces 10 may have a predetermined shape, e.g., a rounded form or similar to a section of a ball. The underside of press shoe 4 and/or the end faces 10 of pistons 5 (or piston 5'), may be provided with a slip coating. The corresponding opposing face may have a smooth and metallic surface. Because, in general, the coating materials that exhibit particularly low coefficients of friction are too soft, they may be deposited in combination with additional support materials. For example, slip material and support material are regularly or randomly interspersed with each other. Bodies or fibers may be imbedded, e.g., in a stable matrix that may form the slip material or, alternatively, fibers, felt, or cloth may reinforce a slip material matrix.

It may be preferable to offset a center of stop face 8 in a direction of roll 3 relative to the imaginary cylinder face passing through tilt axis K of press shoe 4. The offset may be less than or equal to one third a maximal structural stroke of the press shoe, e.g., a maximum of approximately 15 mm. Accordingly, press shoe 4 may only be lifted by less than approximately 0.1 mm from stop 6 when press shoe 4 is forward with increasing load, i.e. the inlet side of press shoe 4 approaches roll 3 by less than the outlet side of press shoe 4. Thus, sliding movements under high jamming force may be prevented and wear and tear may be minimized.

Figure 2:
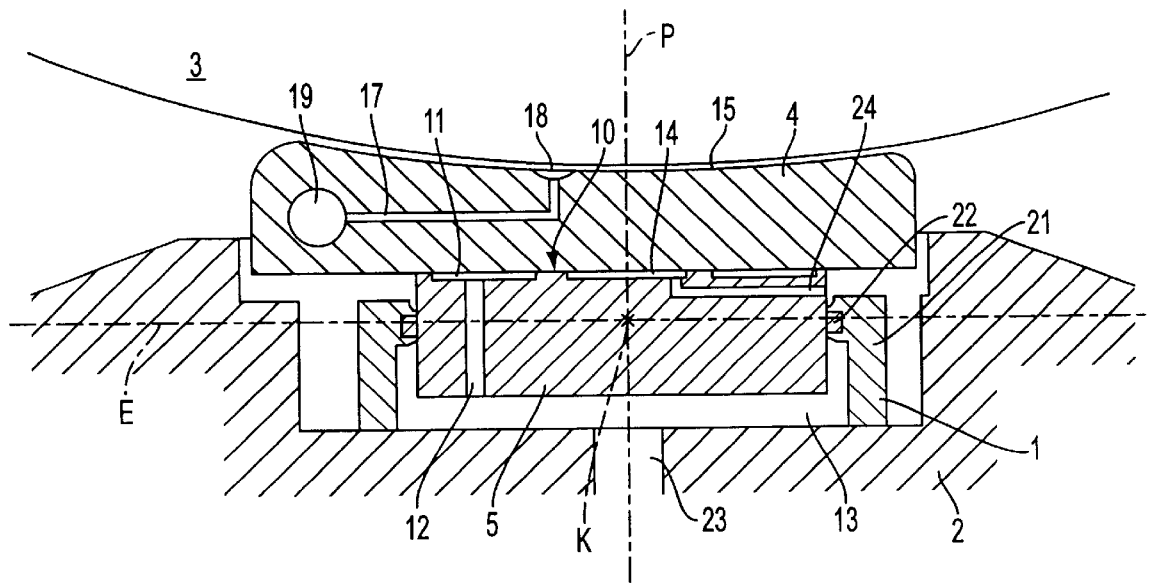
FIG. 2 illustrates a cross section of a second embodiment of the shoe press in accordance with the present invention taken through a support element.
Figure 3:
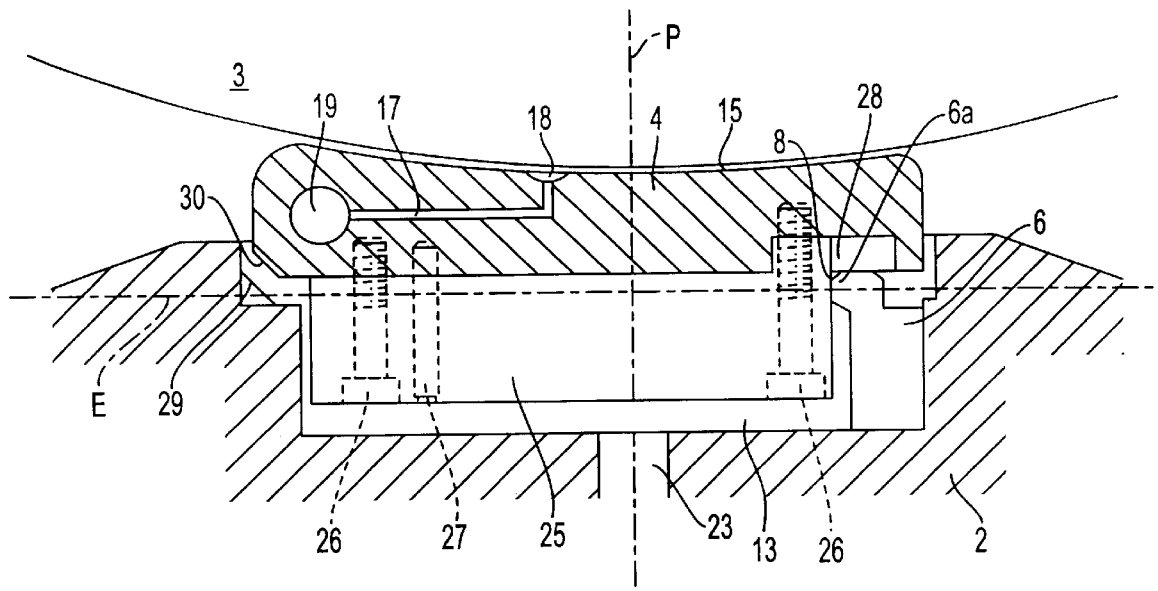
FIG. 3 illustrates the shoe press, depicted in FIG. 2, in a cross section between two support elements.
Figure 4:
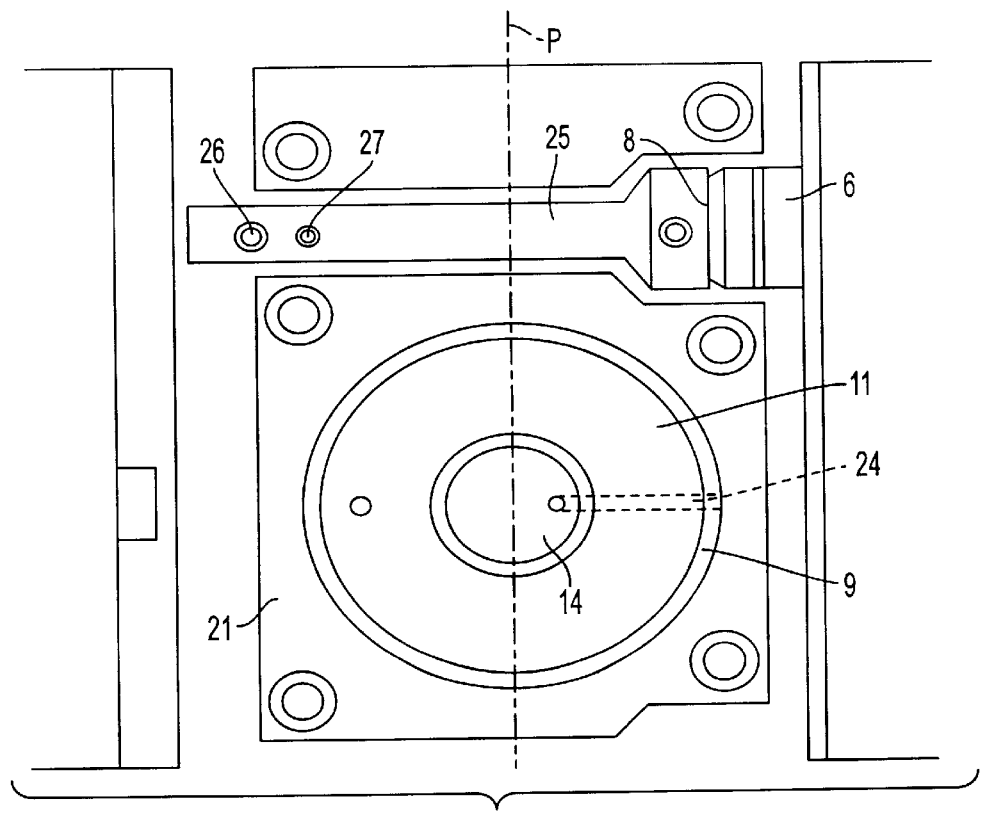
FIG. 4 illustrates a top view of the support element of the shoe press depicted in FIG. 2, with the press shoe removed.
Figure 5:
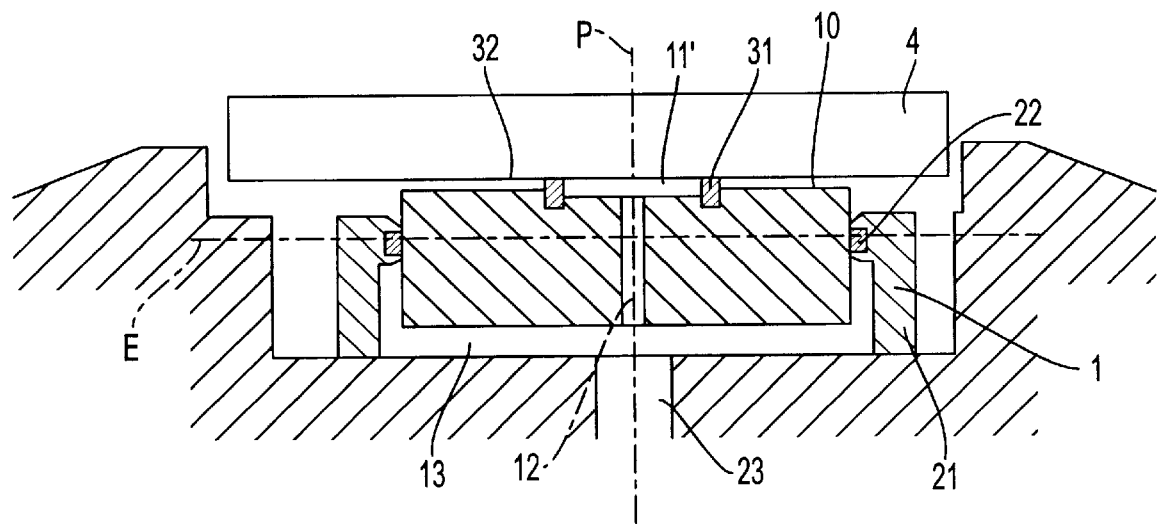
FIG. 5 illustrates a cross section of a third embodiment of the shoe press in accordance with the present invention.

FIGS. 2–4 illustrate another embodiment of a shoe press according to the present invention. In the illustrated embodiments, the felt belt and press jacket have not been included. Accordingly, press shoe 4 may be pressed against counter roll 3 by a single row of pistons 5, which may be arranged longitudinally along the length of counter roll 3. Pistons 5 may be guided, e.g., individually, so they may be vertically moved within, and with respect to, cylinder block 21. Further, pistons 5 may be supported within cylinder block 21 by an annular guiding and sealing region 22 so that a small angle of tilt may be possible. Thus, pistons 5 may be assured of always resting flush against press shoe 4 even when some degree of tilt occurs in press shoe 4. In this arrangement tilt axis K of press shoe 4 may be disposed at an intersection of press plane P and a horizontal plane E, i.e., the plane passing through the guiding and sealing region 22. A pressure exerted by press shoe 4 against counter roll 3 may be produced by a fluid delivered to pressure chamber 13 support element 1 via a supply line 23 formed within carrier 2.

In an end face 10 of piston 5, i.e., which is oriented toward press shoe 4, an annular pressure pocket 11 may be formed communicate with pressure chamber 13 of support element 1 through a bore 12 formed within piston 5. Thus, annular pressure pocket 11 may be supplied with pressure fluid during operation, and the pressure within pressure pockets 11 may be brought into conformity with pressure within pressure chamber 13. According to an alternative embodiment, pressure pockets 11 may be supplied with pressure fluid through a separate line. This alternative arrangement would enable the pressure within pressure pockets 11 to be adjusted independently of the pressure within the pressure chamber 13, e.g., the pressure pockets 11 may be maintained at a pressure greater than the pressure in pressure chamber 13.

Another pocket 14 may be formed within end face 10, however, pocket 14 may be pressureless. Pocket 14 may be positioned concentrically inside pressure pocket 11, and may communicate with the environment through a discharge bore 24.

While FIG. 2 illustrates a cross-section through one support element 1 or cylinder/piston device, the cross-section illustrated in FIG. 3 may taken through a portion between adjacent support elements 1 or cylinder/piston devices. The guide elements for press shoe 4 may be accommodated or provided in the intermediary spaces between adjacent support elements 1. In particular, stop 6, which may be provided on carrier 2, may include a stop nose 6a having stop face 8 positioned at approximately the level of plane E, which is also the level provided for guiding and sealing region 22 in cylinder block 21 and tilt axis K of the press shoe 4.

Ribs 25 may be fastened to the underside of press shoe 4 so as to provide a portion of press shoe 4 that comes in to contact with stop 6. As is more clearly illustrated in FIG. 4, ribs 25 may be positioned in a region between adjacent cylinder blocks 21 and may be fastened to press shoe 4 in a suitable manner, e.g., screws 26 and pins 27. To be able to better transmit horizontal shearing forces, grooves 28 may be provided on the underside of press shoe 4 where ribs 25 engage.

As shown with particular clarity in FIG. 4, ribs 25 may be formed to thicken or flare at the trailing end. The thickening may permit a broad support area to contact stop 6. On the leading end, press shoe 4 or rib 25 may have a slight amount of play so as to prevent jamming, e.g., due to thermal influences or to tilting of press shoe.

Further, oblique ramps 29 may be provided on carrier 2 to cooperate with an associated leading beveled edge 30 on the underside of press shoe 4. Oblique ramps 29 and beveled edge 30 may utilize the contact of their inclined faces to further direct press shoe 4 and ribs 25 against stop nose 6a at the bottom end position of press shoe 4.

The operation of the shoe press illustrated in FIGS. 2–4 corresponds, in general, to the previously described operation of the shoe press depicted in FIG. 1. However, press shoe 4, in FIGS. 2–4, is not carried directly by pistons 5, but, rather, by a fluid cushion built up on pressure pockets 11. This feature enables the friction forces acting between press shoe 4 and pistons 5 to be low.

In addition, coolant conduits 17 may be provided in press shoe 4 to enable a coolant to flow through press shoe 4 during operation, thereby cooling press shoe 4. Coolant conduits 17 may extend in a web travel direction A (see FIG. 1) from a region of the nip inlet to a region of, or just before a region of, press plane P. Coolant conduits 17 may be fed into a press face 15 of press shoe 4 through outlet bores 18, which may be formed to flare, e.g., like trumpets. The press shoe 4 may comprise, e.g., a material having a low coefficient of thermal expansion and coolant conduits 17 may be arranged within press shoe 4 to run parallel with each other and may be spaced apart by, e.g., approximately 15–50 mm, in a direction lateral to web travel direction A. A common supply line 19 may be provided on the inlet end of press shoe 4, in a direction lateral to web travel direction A, to connect coolant conduits 17. Coolant may be fed through supply line 19 and may be pressed into the lubricant film between the press jacket (see FIG. 1) and press shoe 4 by coolant conduits 17, i.e., formed as throttle bores, and by flared outlet bores 18. The flared openings of outlet bores 18, i.e., in the region of press face 15, may have a cross-sectional area of, e.g., 1 cm$^2$–3 cm$^2$. Further, axes of outlet bores 18 may be formed to be inclined in web travel direction A relative to press plane P. The axes of outlet bores 18 may be inclined at an angle of, e.g., approximately 1°–3°. The coolant, e.g., cooling oil, may cool press shoe 4 on its leading end region by heat transfer from supply line 19 and coolant conduits 17, and on its trailing end region by the oil being pressed into the lubricating film.

This arrangement ensures that press shoe 4 may remain at approximately a same temperature all over and that press shoe 4 will not be thermally warped, e.g., when the load is taken off of support elements 1. This arrangement may also prevent jamming forces in the guides of pistons 5.

In an alternative the embodiment to that depicted in FIGS. 2–4, FIGS. 5 and 6 illustrate another embodiment of a shoe press according to the present invention. In this alternative embodiment, a smaller pressure pocket 11', which may be sealed in a direction of press shoe 4 by an elastically supported seal 31, may be provided in lieu of the larger pressure pocket 11 provided in end face 10 of piston 5. Pressure pocket 11' may communicate with pressure chamber 13 of support element 1 through a bore 12. However, only a portion of the piston pressure may be transmitted to press shoe 4 by pressure pocket 11'. A greater portion of the pressure may travel to press shoe 4 by two sliding bodies 32 ahead of and behind pressure pocket 11.

Figure 6:
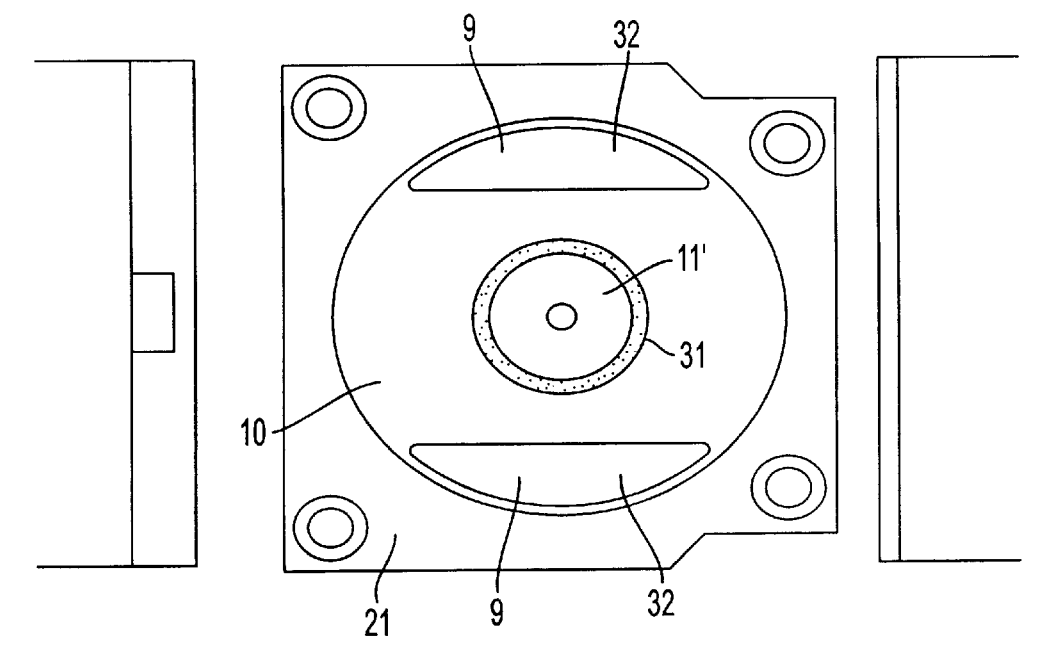
FIG. 6 illustrates a top view of the support element of the shoe press depicted in FIG. 5, with the press shoe removed.

FIG. 6 illustrates sliding bodies 32 arranged on opposite sides of pressure pocket 11'. Sliding bodies 32 may be provided with smooth surfaces to press against press shoe 4. Further, the surfaces of sliding-bodies 32, i.e., the portions oriented toward press shoe 4, may be provided with a slip coating 9 to reduce friction forces between pistons 5 and press shoe 4. Slip coating 9 may be formed of a slip material that reduces sliding friction, e.g., polytetrafluoroethylene (PTFE), molybdenum sulfite, or polyethylene, incorporated into a matrix that absorbs high pressure loads.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A shoe press for treating a material web comprising:
   a press shoe to be pressed against an opposing element with a fluid impermeable press jacket and a felt belt positionable between the press shoe and the opposing element;

a plurality of support elements comprising cylinder devices and pistons supported on a carrier;

the press shoe having a concave-shaped press face forming a nip with the opposing element, the nip having a predetermined longitudinal span;

the press shoe being movable on the plurality of support elements;

the pistons of the plurality of support elements carrying the press shoe to permit a tilting movement of the press shoe both in a web travel direction and lateral to the web travel direction;

a stop coupled to the press shoe in the web travel direction and absorbing horizontal forces acting on the press shoe;

a tilt axis of the press shoe and a stop face of the stop being substantially positioned in one of a common plane and an imaginary cylinder face having a radius greater than 250 m; and a press plane disposed substantially perpendicular to one of the common plane and the imaginary cylinder face.

2. The shoe press according to claim 1, at least one of the press shoe and the pistons include a portion for reducing friction occurring between the press shoe and the pistons.

3. The shoe press according to claim 2, the pistons comprising end faces that carry the press shoe, the end faces including a slip coating.

4. The shoe press according to claim 3, the slip coating comprising a stable, pressure absorbing matrix with an imbedded slip material to reduce sliding friction.

5. The shoe press according to claim 4, the slip coating comprising a slip material including one of polytetrafluoroethylene, molybdenum sulfite, and polyethylene.

6. The shoe press according to claim 3, the slip coating including a matrix comprised of a slip material reinforced by one of fibers, felt, and cloth.

7. The shoe press according to claim 3, further comprising hydraulic pressure pockets formed in the end faces.

8. The shoe press according to claim 7, wherein fluid pressure in the hydraulic pressure pockets is adjustable to a higher value than pressure in a cylinder chamber associated with the pistons.

9. The shoe press according to claim 7, wherein the hydraulic pressure pockets communicate with pressure chambers formed in the support elements through bores in the pistons.

10. The shoe press according to claim 7, further comprising pressureless pockets, wherein the hydraulic pressure pockets are formed as annular and the pressureless pockets are formed inside the pressure pockets.

11. The shoe press according to claim 1, further comprising coolant conduits provided in the press shoe, wherein coolant flows to cool the press shoe during operation.

12. The shoe press according to claim 11, the coolant conduits extend in the web travel direction from a region of a nip inlet into one of a region of and a region just ahead of the press plane; and the coolant conduits including flaring outlet bores coupled to a press face of the press shoe.

13. The shoe press according to claim 12, the coolant conduits communicating on an inlet end with a common supply line, the common supply line extending, in the region of the nip inlet, lateral to the web travel direction.

14. The shoe press according to claim 12, the coolant conduits are formed as throttle bores.

15. The shoe press according to claim 12, the flaring outlet bores comprising, in an exit region on the press face, a cross sectional area of between approximately 1 cm² to 3 cm².

16. The shoe press according to claim 15, axes of the outlet bores are formed inclined approximately 1° to 3° in the web travel direction relative to the press plane.

17. The shoe press according to claim 12, the coolant conduits being positioned parallel to one another and being spaced apart lateral to the web travel direction by approximately 15 to 50 mm.

18. The shoe press according to claim 1, the press shoe comprising a material having a low coefficient of thermal expansion.

19. The shoe press according to claim 1, the opposing element comprising a counter roll.

20. A shoe press for forming an extended nip with an opposing element to treat a material web guided through the extended nip in a web travel direction, the shoe press comprising:

a press shoe;

a support element comprising a first portion for supporting the press shoe and enabling tilting movement around a tilt axis of the press shoe in at least one of in and lateral to the web travel direction;

a stop, comprising a stop face, coupled to the press shoe and restraining movement of the press shoe in the web travel direction;

a press plane disposed through the extended nip and including the tilt axis of the press shoe; and the tilt axis and the stop face defining one of a plane and an imaginary cylinder face having a radius greater than 250 m which is perpendicular to said press plane.

21. The shoe press according to claim 20, the support element comprising a guiding and sealing region for guiding movement of the first portion substantially parallel to the press plane.

22. The shoe press according to claim 21, the first portion comprising an end face supporting an underside of the press shoe; and at least one of the underside of the press shoe and the end face comprising a surface that reduces friction between the underside of the press shoe and the end face.

23. The shoe press according to claim 22, the end face comprising a pressure pocket for carrying the press shoe.

24. The shoe press according to claim 23, the support element comprising a second portion that moves relative to the first portion; and the press pocket communicating with the second portion through a bore formed in the first portion.

25. The shoe press according to claim 24, the end face further comprising a pressureless pocket formed within the pressure pocket; and the pressureless pocket communicating with an exterior of the support device through an additional bore formed in the first portion.

26. The shoe press according to claim 23, the pressure pocket comprising an annular shape.

27. The shoe press according to claim 23, the pressure pocket formed by an annular, elastically supported seal.

28. The shoe press according to claim 20, the press shoe comprising an inlet side and an outlet side formed on opposite sides of the press plane; and the inlet side comprising coolant supply line extending through the inlet side and lateral to the web travel direction.

29. The shoe press according to claim 28, the inlet side further comprising:

coolant conduits for transporting coolant from the coolant supply line through the inlet side in a web travel direction; and an outlet bore for transporting coolant from the coolant conduits to a surface of the press shoe forming the extended nip.

30. The shoe press according to claim 20, the support element further comprising a second portion;

the first portion comprising at least one piston; and the second portion comprising a cylinder.

31. The shoe press according to claim 20, further comprising a rib coupled to an underside of the press shoe and located between adjacent support elements.

32. The shoe press according to claim 31, the rib including a flared end to contact the stop face.

33. A method for treating a material web comprising:

movably supporting a press shoe on a support element, the support element including at least a cylinder and piston;

aligning a stop face of a stop device and a tilt axis of the press shoe in a substantially planar arrangement, a press plane being perpendicular to one of said planar arrangement and an imaginary cylinder face having a radius greater than 250 m which includes the tilt axis;

forming an extended nip between a press shoe and an opposing element;

guiding the material web through the extended nip in a web travel direction;

supporting a tilting of the press shoe about the tilt axis in at least one of in and lateral to the web travel direction; and absorbing horizontal forces acting on the press shoe in the web travel direction with the stop device;

wherein said stop device is coupled to said press shoe.

34. The method according to claim 33, further comprising:

providing a sliding surface on at least one of the piston and the press shoe to reduce friction forces between the piston and the press shoe.

35. The method according to claim 33, the movably supporting of the press shoe comprising:

forming a pressure pocket in a face of the support element contacting the press shoe; and providing a pressure fluid to the pressure pocket, the pressure fluid supporting the press shoe.

36. The method according to claim 33, further comprising:

conducting a coolant through the press shoe from within he press shoe to an outer surface of the press shoe forming the extended nip.

37. The method according to claim 36, conducting a coolant comprising:

forming a coolant supply line within an inlet portion of the press shoe; and forming a plurality of substantially parallel coolant conduits extending from the coolant supply to fluid outlets, wherein the fluid outlets are located at a position less than a mid-point of the press shoe, in the web travel direction, and wherein the fluid outlets include flared conduit portions.

38. A shoe press for treating a material web comprising:

a press shoe to be pressed against an opposing element with a fluid impermeable press jacket and a belt positionable between the press shoe and the opposing element;

a plurality of support elements comprising cylinder devices and pistons supported on a carrier;

the press shoe having a concave-shaped press face forming a nip with the opposing element, the nip having a predetermined longitudinal span;

the press shoe being movable on the plurality of support elements;

the pistons of the plurality of support elements carrying the press shoe to permit a tilting movement of the press shoe about a tilting axis;

said carrier surrounding at least part of said press shoe, said carrier having a face substantially opposing a face of said press shoe in a longitudinal direction of said belt;

a stop member disposed between said faces of said press shoe and said carrier, respectively, in the web travel direction and absorbing horizontal forces acting on the press shoe;

a tilt axis of the press shoe and a center of a contact surface between said stop and at least one of said faces of said press shoe and said carrier being substantially positioned in one of a common plane and an imaginary cylinder face having a radius greater than 250 m; and a press plane disposed substantially perpendicular to one of the common plane and the imaginary cylinder face.

39. The shoe press of claim 38, wherein said stop member is coupled to one of the press shoe and the carrier.

* * * * *